US006574459B1

(12) United States Patent
Kaminski et al.

(10) Patent No.: US 6,574,459 B1
(45) Date of Patent: Jun. 3, 2003

(54) MULTIPLE BRANCH RECEIVER SYSTEM AND METHOD

(75) Inventors: Walter Joseph Kaminski, Long Valley, NJ (US); Arild Kolsrud, Bridgewater, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/549,919

(22) Filed: Apr. 14, 2000

(51) Int. Cl.[7] ................................................ H04B 7/00
(52) U.S. Cl. ....................... 455/272; 455/269; 455/266; 455/275
(58) Field of Search ........................ 455/269, 272–273, 455/266, 339, 190.1, 131, 168.1, 180.1, 313, 12.1, 275, 428, 582, 143, 209, 314, 580, 179.1, 188.1, 150.1; 370/70, 341, 497, 316, 120–121, 981–982, 335, 318; 375/122, 216, 316, 328, 347, 200, 206

(56) References Cited

U.S. PATENT DOCUMENTS

| 5,280,636 A | 1/1994 | Kelley et al. ................ 455/131 |
| 5,602,847 A | 2/1997 | Pagano ........................ 370/470 |

(List continued on next page.)

FOREIGN PATENT DOCUMENTS

| EP | 2 338 853 A | 12/1999 | ............ H04B/1/26 |
| GB | 2338853 | 12/1999 | ............ H04B/7/08 |
| WO | WO 97 05705 | 2/1997 | ............ H04B/1/26 |

OTHER PUBLICATIONS

"CLC5526, CLC5956, and CLC5902 Diversity Receiver Chipset", *National Semiconductor Corporation*, Rev. 1.4, pp. 1–4 (Oct. 30, 1998).

"12–Bit, 65 MSPS IF Sampling A/D converter", *Analog Devices*, Norwood, MA, pp. 1–24 (1998).

"The Design of Flexible Receivers for Communicating Appliances", by Lawton, M.C., et al., *IEEE*, 7803–3157 pp. 1060–1064 (1996).

*Primary Examiner*—Daniel Hunter
*Assistant Examiner*—Pablo N Tran

(57) ABSTRACT

A receiver provides received analog signals to a plurality of channel branches, and on at least one of the channel branches, the frequency of the received analog signals is adjusted independent of the relative positions of the corresponding analog signals in the radio frequency (RF) spectrum. The analog signals on the channel branches are then combined, and the combined analog signals are converted into the digital domain. For example, the receiver comprises at least one antenna(s) which receives radio frequency (RF) analog signals. A channel branch arranger receives the analog RF signals from the antenna(s) and provides the RF analog signals to a plurality of channel branches. A frequency conversion arrangement comprising at least one frequency converter on at least a respective one of the channel branches adjusts the frequency band of the analog RF signals on the respective channel branch independent of the relative positions of the corresponding analog signals in the RF spectrum of the different channel branches. The analog signals on the channel branches are combined, and a single analog to digital converter converts the combined analog signals into digital signals. In converting the composite analog signals into the digital domain, the frequency bands of the analog signals are positioned in a plurality of Nyquist zone channels in the digital domain. By properly selecting the frequency bands for the analog signals on the channel branches and the sampling rate for the A/D converter, the available bandwidth for the A/D converter can be more efficiently used, and/or time coherence and/or phase coherence can be provided.

16 Claims, 4 Drawing Sheets

U.S. PATENT DOCUMENTS

| | | | |
|---|---|---|---|
| 5,852,784 A | * 12/1998 | Ito et al. | 455/143 |
| 5,956,620 A | * 9/1999 | Lazaris-Brunner et al. | 370/316 |
| 6,014,571 A | * 1/2000 | Enoki | 455/131 |
| 6,052,569 A | * 4/2000 | Ehrhardt | 455/188.1 |
| 6,064,665 A | * 5/2000 | Leuck et al. | 370/335 |
| 6,091,963 A | * 7/2000 | Mannerstr.ang.le et al. | 455/150.1 |
| 6,246,674 B1 | * 6/2001 | Feuerstein et al. | 370/334 |

* cited by examiner

MULTIPLE BRANCH RECEIVER SYSTEM AND METHOD

BACKGROUND OF THE INVENTION

1. Field of The Invention

This invention relates to a wireless communications and, more particularly, to a multiple branch receiver architecture in a wireless communications system.

2. Description of Related Art

The service area of a wireless communications system is partitioned into connected service domains known as cells, where wireless units communicate via radio links with a base station (BS) serving the cell. The base station is coupled to a land network, for example through a Mobile Switching Center (MSC) which is connected to a plurality of base stations dispersed throughout the service area. In the wireless communications industry, a service provider is often granted two or more non-contiguous or segregated frequency bands to be used for the wireless transmission and reception of RF communications channels. For example, in the United States, a base station for an "A" band provider for cellular communications receives frequency channels within the A (825–835 MHz), A'(845–846.5 MHz) and A"(824–825 MHz) bands, and the wireless units receive frequency channels within the A (870–880 MHz), A'(890–891.5 MHz) and A"(869–870 MHz) bands. A base station for a B band provider receives frequency channels within the B (835–845 MHz) and B'(846.5–849 MHz) frequency bands, and the wireless units receive frequency channels within the B (880–890 MHz) and B'(891.5–894 MHz) frequency bands. Additionally, a base station for a Personal Communications Systems (PCS) provider may receive frequency channels from wireless units on one or more PCS bands (1850 MHz–1910 MHz), and the wireless units receive frequency channels on one or more PCS bands (1930–1990 MHz).

In order to reduce system hardware costs, a service provider would want to use a common receiver for the simultaneous reception and processing of signals within the non-contiguous frequency bands. In a typical receiver architecture, a down-conversion stage for each frequency band is typically used to down-convert and to manipulate the placement of each frequency band at intermediate frequencies (IF) such that the frequency bands of the modulated analog signals are converted to a corresponding IF frequency spectrum and can be sampled at a reduced sampling rate by separate analog to digital (A/D) converters. To use a single A/D converter to digitize the modulated analog signals in the non-contiguous bands, a single A/D would have to sample at a high enough rate to encompass both frequency bands. This is an inefficient approach because the A/D converter is using bandwidth in sampling unwanted frequencies in the gap between the frequency bands. To reduce the frequency gap between non-contiguous frequency bands, a down-conversion stage for each of the frequency bands is used to down-convert and manipulate the placement of each frequency band at IF such that the bands are closer together to fit in a smaller bandwidth for the A/D converter. Another approach to improve the efficient use of the A/D converter bandwidth involves down-converting both frequency bands such that a replica of one of the frequency bands is positioned in the frequency gap between the frequency bands.

When the IF spectrum is sampled by an A/D converter at a sampling rate which is greater than or equal to twice the combined signal bandwidth, which can be referred to a the Nyquist sampling rate, the A/D input signal bandwidth rotates or folds periodically about itself at multiples of one-half the sampling frequency. As such, the signal bandwidth and mirror images of the signal bandwidth are periodically repeated at frequency intervals corresponding to the sampling rate of the A/D converter. Each replica of the signal bandwidth can be referred to as a Nyquist zone, and the IF signal bandwidth folds back to the first Nyquist zone between about 0 Hz and one-half the sampling frequency. The bandwidth of a Nyquist zone corresponds to the Nyquist bandwidth.

The periodicity of the spectral density in the digital domain is a basic property of sampled waveforms which can be predicted by determining the Fourier transform of the time-sampled waveform. Generally, the A/D converter samples at at least twice the signal bandwidth of the composite frequency bands (i.e. the Nyquist sampling rate) to obtain a digital representation of the modulated analog IF signal. Accordingly, the sampling rate for the A/D converter is chosen such that the Nyquist bandwidth encompasses the desired frequency bands. The higher the sampling rate, the wider is the Nyquist bandwidth. If the waveform is sampled at a rate less than twice its signal bandwidth (the Nyquist bandwidth), an undesirable overlapping between the adjacent periodic spectrums occurs—a well known phenomena known as aliasing. Accordingly, the sampling rate and the IF frequency are chosen such that the Nyquist bandwidth encompasses the frequency band to be converted while reducing the sampling rate of the A/D converter, enabling the use of lower sampling rate A/D converters with reduced cost. Accordingly, the wider the separation or frequency gap between the frequency bands, the current receiver architectures reach a point where the use of a single A/D is not viewed as practical or efficient. If the frequency bands are far enough apart or if desired, a separate antenna is used for each segregated frequency band. In multiple antenna architectures where antennas are dedicated to different frequency bands, a separate A/D is typically used for each antenna path.

Wireless communication base stations also use multiple antennas receiving the same frequency band to support a technique known as N-way receive diversity to mitigate the effects of multipath fading. The base station comprises one or more radios that comprises N spatially-separate receive antennas ("Rx1" through "RxN"). Because multipath fading is a localized phenomenon, it is highly unlikely that all of the spatially-separated receive antennas will experience multipath fading at the same time. Therefore, if an incoming signal is weak at one receive antenna, it is likely to be satisfactory at one of the others. For example, when the topography of the terrain is hilly or mountainous, or when objects such as buildings or trees are present, a signal transmitted by a wireless unit can be absorbed or reflected such that the signal quality is not uniform at the base station. As such, many independent paths result from the scattering and reflection of a signal between the many objects that lie between and around the wireless unit and the base station. The scattering and reflection of the signal creates many different "copies" of the transmitted signal ("multipath signals") arriving at the receive antenna of the base station with various amounts of time delay, phase shift and attenuation. As a result, the signal received at the base station from the wireless unit is made up of the sum of many signals, each traveling over a separate path. As the multipath signals are added constructively and destructively at the receive antenna of the base station, severe local variations in the received signal strength can occur. This phenomenon is widely known as multipath fading or fast fading or Rayleigh fading.

As is well-known in the prior art, a diversity combiner can combine N incoming signals, each from one of N receive antennas, using various techniques (e.g., selection diversity, equal gain combining diversity, maximum ratio combining diversity, etc.) to reduce the adverse effects of multipath fading and improve the reception of an incoming signal. In diversity combining techniques performed in the digital domain, the incoming analog signals from the N receive antennas are maintained on separate channel branches and provided to separate analog to digital (A/D) converters on each channel branch for conversion in the digital domain where diversity techniques can be used to improve reception of the incoming signal. Using multiple A/D converters increases costs and can result in reduced performance due to an incoherence between the time samples performed by separate A/D converters of the analog signals from the N receive antennas. Removing any incoherence between the time samples of the incoming signals from the N receive antennas is important when accurate measurements of time delay or phase shift is required. Alternatively, the incoming analog signals from the N receive antennas can be combined or selected prior to digital conversion according to a diversity technique performed in the analog domain, and the resulting analog signal is provided to a single analog to digital (A/D) converter for conversion to the digital domain.

The above multiple branch receiver architectures do not take advantage of the potential bandwidths, flexibility and/or time and/or phase coherence capability provided by A/D converters in converting analog signals into the digital domain.

SUMMARY OF THE INVENTION

The present invention involves a receiver which provides received analog signals to a plurality of channel branches, and on at least one of the channel branches, the frequency of the received analog signals is adjusted independent of the relative positions of the corresponding analog signals in the radio frequency (RF) spectrum. The analog signals on the channel branches are then combined, and the combined analog signals are converted into the digital domain. For example, the receiver comprises at least one antenna(s) which receives radio frequency (RF) analog signals. A channel branch arranger receives the analog RF signals from the antenna(s) and provides the RF analog signals to a plurality of channel branches. A frequency conversion arrangement comprising at least one frequency converter on at least a respective one of the channel branches adjusts the frequency band of the analog RF signals on the respective channel branch independent of the relative positions of the corresponding analog signals in the RF spectrum of the different channel branches. The analog signals on the channel branches are combined, and a single analog to digital converter converts the combined analog signal into digital signals. In converting the composite analog signals into the digital domain, the frequency bands of the analog signals are positioned in a plurality of Nyquist zone channels in the digital domain. By properly selecting the frequency bands for the analog signals on the channel branches and the sampling rate for the A/D converter, the available bandwidth for the A/D converter can be more efficiently used, and/or time coherence and/or phase coherence can be provided.

BRIEF DESCRIPTION OF THE DRAWINGS

Other aspects and advantages of the present invention may become apparent upon reading the following detailed description and upon reference to the drawings in which.

DETAILED DESCRIPTION

Illustrative embodiments of a receiver system using multiple channel branches on which signal bandwidths for RF analog signals are positioned relative to the positions of the signal bandwidths in the Nyquist bandwidth but independent of the relative positions of the signal bandwidth(s) at RF according to the principles of the present invention is described below. For example, if two frequency bands on at least two channel branches correspond to frequency bands that are separated by a certain amount at RF, a converted band on one channel band can be closer or further apart from the frequency band on the other channel branch when compared to the corresponding frequency bands at RF. The frequency bands on the at least two channel branches have positions relative to the positions of the respective signal bandwidths in the Nyquist bandwidth in that the frequency bands occupy different portions of the Nyquist bandwidth of an A/D converter, but the frequency bands can be positioned independent of their positions relative to each other at RF. Consequently, in a diversity setting, if the two frequency bands on the at least two channel branches correspond to the same frequency bands at RF, the frequency band on at least one channel branch can be converted to a different frequency band than the frequency band on the at least other channel branch so long as the frequency bands occupy different portions of the Nyquist bandwidth.

Figure 1:
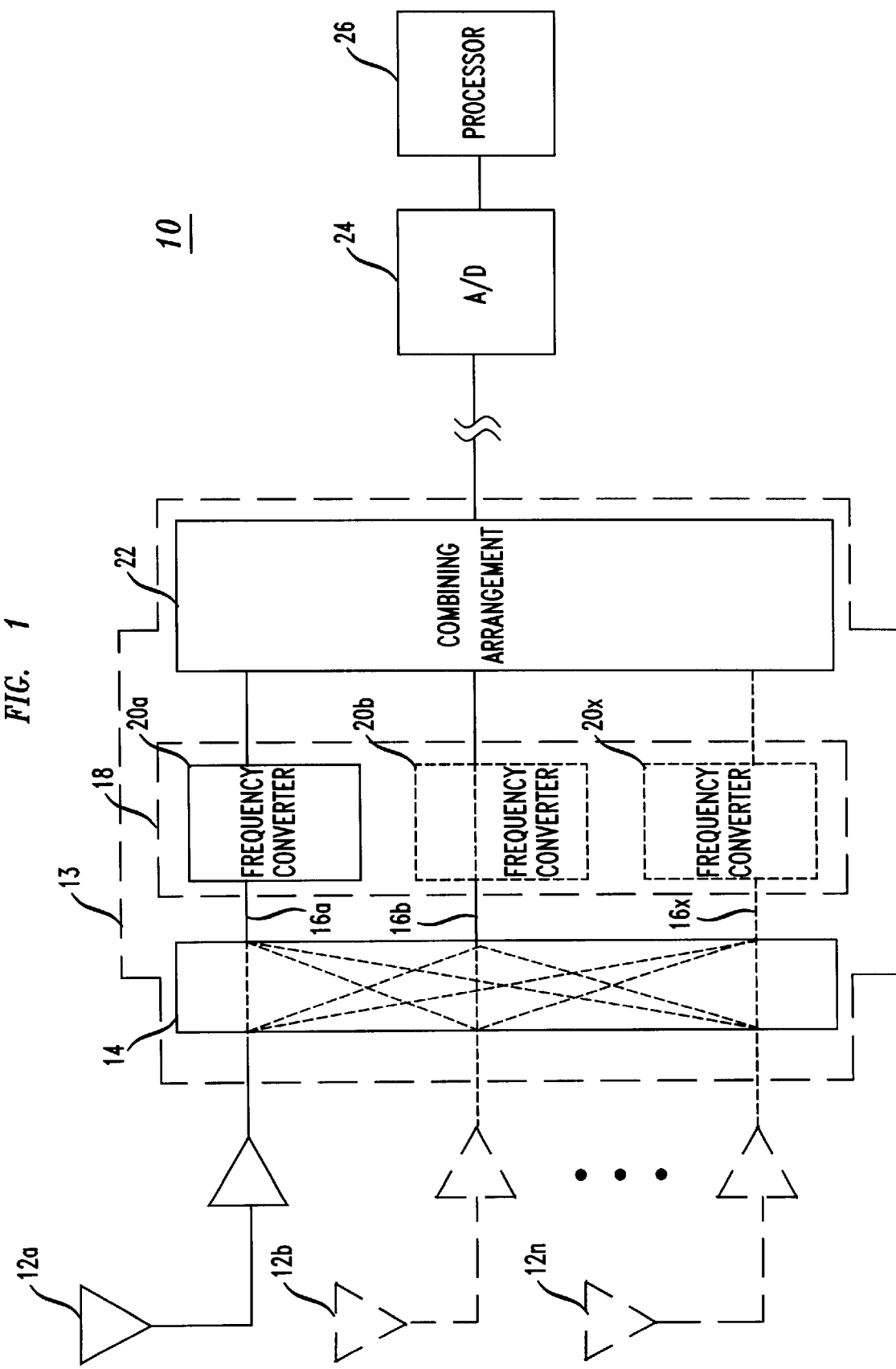
FIG. 1 shows a general block diagram of a multiple branch receiver according to the principles of the present invention.

With particular reference to FIG. 1, a receiver 10 includes N antennas 12a–n which receive analog signals over RF communications channels, where N>=1. The antenna 12a could be a multi-frequency band antenna. A frequency channelizer 13 includes a channel branch arranger 14, such as an N-plexer filter or combiner array, which combines and/or separates the received RF analog signals or portions thereof and provides the received analog signals into X channel branches 16a–x in a desired manner, where X>=2. For example, different channel branches 16a–x can carry the analog signals for corresponding RF frequency bands, the channel branches 16a–x can carry RF analog signals received by different antennas or sets of antennas, and/or multiple channel branches having copies of the RF analog signals of multiple or the same frequency band(s). A frequency conversion arrangement 18 comprises at least one frequency converter 20a–x on at least one of the channel branches 16a–x to manipulate the placement of the analog signals on the respective channel branch 16a–x into at least one intermediate frequency (IF) band that does not overlap in the Nyquist band width of the A/D converter relative to the frequency band on at least one other channel branch 16a–x. In this embodiment, each channel branch 16a–x is shown with a frequency conversion stage 20a–x, but the number of channel branches need hot equal the number of frequency conversion stages 20a–x.

A combining.arrangement 22 combines the analog signals on the channel branches 16a–x in desired fashion. The resulting composite analog signal is provided with analog signals in different frequency bands to an analog to digital converter 24. The different frequency bands of the analog signals fold back to non-overlapping portions of the Nyquist bandwidth provided by the analog to digital (A/D) converter 24 sampling the composite analog signal at a sampling rate which is greater than twice the bandwidth of the combined bandwidth of the different frequency bands. In converting the composite analog signal into the digital domain, the A/D converter 24 processes the composite analog signal into Nyquist zone channels or bands in the first Nyquist zone. The Nyquist zone channels in the digital domain correspond to the different frequency bands of the analog signals. Digital signal processing circuitry 26 can retrieve the digital signals from the Nyquist zone channels of the first Nyquist zone, because the different channels eventually end up in the first Nyquist zone after digitizing the analog input signals, for example using digital filters, digital combiners, digital detectors, digital demodulators, digital downconverters, such as a Digital Down Converter (DDC) with Numerical Controller Oscillator (NCO) to digitally down convert the data rate (which is referred to as decimation), and/or other digital processing. The DDC can tune to the respective frequencies for further signal processing. Therefore, the receiver 10 can more effectively use the bandwidth available in a single A/D by adjusting the relative positioning of the different RF frequency bands on different channel branches 16a–x.

Figure 2:
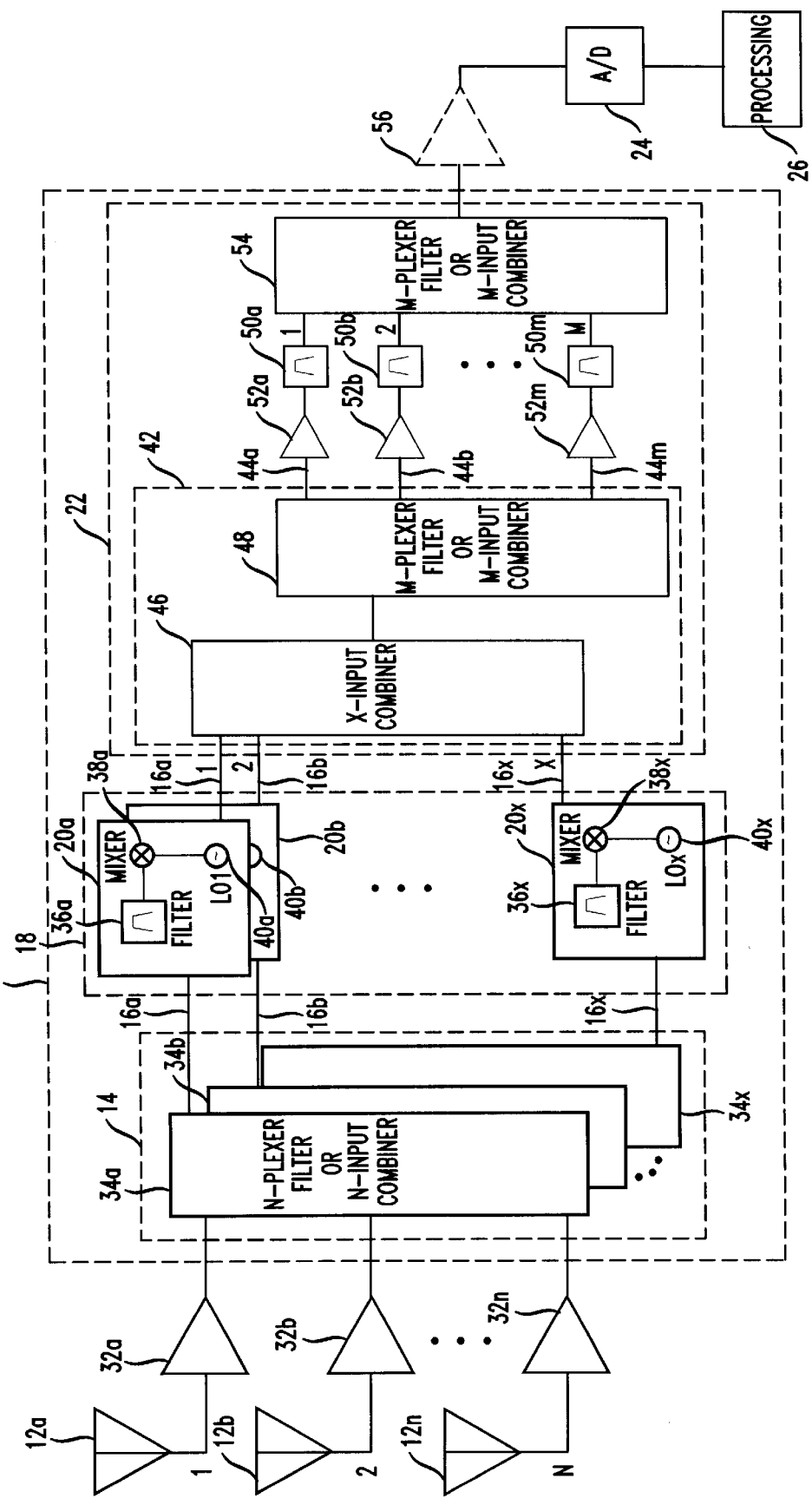
FIG. 2 shows a block diagram of an embodiment of the multiple branch receiver according to the principles of the present invention.

Depending on the embodiment and due to the flexibility of the receiver according to the principles of the present invention, the receiver 10 can be implemented in different ways to more effectively use the potential bandwidth of an A/D converter. For example, FIG. 2 shows an embodiment of a receiver 30 which includes antennas 12a–n which receive RF analog signals In the embodiment of FIG. 1, the channelizer 13 receives the RF analog signals from receive circuitry 32a–n, such as low noise amplifiers (LNAs), associated with each antenna 12a–n. The channelizer 13 includes the channel branch arranger 14 which in this embodiment is a channel network which receives the RF analog signals in the same and/or different frequency band(s) from the antennas 12a–n. The channel network provides the RF analog signals and/or a portion thereof to an appropriate channel branch 16a–x. In this embodiment, the channel network comprises an array of X N-plexer filters or N-input combiners 34a–x where each one of the X N-plexer filters or N-input combiners 34a–x can be connected to one to N antennas 12a–n. Depending on the embodiment, the number of multiplexers or combiners 34a–x can but need not correspond to the number of channel branches 16a–x. The array of filters or combiners 34a–x provides RF analog signals from the at least one antenna 12a–n and at least one radio frequency (RF) band and any combination of RF signals from multiple antennas 12a–n and/or of RF signals having the same or different frequency band(s) to at least two channel branches 16a–x.

The RF analog signals on the channel branches 16a–x are subjected to a frequency conversion arrangement 18 which comprises at least one frequency conversion stage on at least one of the at least two channel branches 16a–x to provide analog signals at at least two different frequency bands on at least two channel branches 16a–x. To obtain one of the frequency bands of the at least two different frequency bands, the RF analog signals from two or more different antennas 12a–n at the same frequency band can be combined prior to or after any frequency conversion stage 20a–x, for example using signal diversity combining or simply combining at RF. Additionally, the channel branch arranger 14 can include a dedicated connection(s) between an antenna 12a–n or diversity combiner and a frequency conversion stage 20a–x on a respective channel branch 16a–x. In this embodiment, the frequency conversion stages 20a–x manipulate the placement of the RF signal bandwidth(s) from the N antennas 12a–n into intermediate frequency (IF) band(s). In manipulating the placement of the frequency band(s) on the channel branch(es) 16a–x relative to frequency band(s) on the other channel branch(es)(which can be the same, overlapping or different frequency band(s) before being manipulated), the frequency band(s) are positioned independent of the relative positioning between the corresponding RF band(s). Depending on the embodiment, a channel branch 16a–x need not have a frequency conversion stage 20a–x, so long as the at least other frequency band is positioned independent of the relative positioning between the corresponding frequency bands at RF.

In this embodiment, each frequency converter stage 20a–x includes a filter 36a–x which filters the incoming RF signals to produce an RF frequency band to be frequency converted. The RF frequency band(s) to be converted by the frequency converter stage(s) 20a–x can be of the same, different and/or overlapping frequency bands from at least one antenna 12a–n, and the resulting frequency bands occupy at least two different frequency bands. At each frequency converter stage 20a–x, the filtered RF frequency band is provided to a mixer 38a–x which converts the frequency band of the RF analog signals by mixing the frequency band with a local oscillator signal from a local oscillator (LO) 40a–x as would be understood by one of skill in the art.

The analog signals at the at least two different frequency bands from the frequency conversion arrangement 18 are provided to the combining arrangement 22. In this embodiment, the combining arrangement 22 includes a combiner/splitter network 42 which combines the frequency bands from the frequency conversion arrangement 18 in a desired manner and splits the analog signals in a desired manner, for example in different frequency bands, to provide the analog signals on M channel paths 44a–m, where M>=2. The channel branches 16a–x can correspond to the channel paths 44a–m. Alternatively, the at least two different frequency bands on the channel branches 16a–x can be split apart onto different channel paths 44a–m and/or the analog signals from multiple channel branches 16a–x combined onto a single channel path 44a–m.

In this embodiment, the combiner/splitter network 42 includes an X-input combiner 46 which combines the analog signals on the channel branches 16a–x and provides the signal spectrum to an M-output splitter 48. Depending on the embodiment, the M-output splitter 48 can be an M-plexer filter which selectively produces a frequency band on a respective channel path 44a–m. The M-plexer filter selectively matches the impedance for the frequency band or channel to reduce losses. The M-output splitter 48 can be an M-output splitter which provides replicas of the signal bandwidth(s) on the channel paths 44a–m. The combiner/splitter network 42 has been described with X inputs which are combined and split onto M channel paths 44*a–m*. The number of inputs or channel branches 16*a–x* can correspond to the number of channel paths 44*a–m* but need not. Depending on the embodiment, the structure and manner in which RF analog signals provided to the channel branches 16*a–x* are frequency converted and combined and split into M channel paths can vary. The frequency band on a channel path 44*a–m* can correspond to at least one of the two different frequency bands on the channel branches 16*a–x*, a combination of signals from at least two different channel branches 16*a–x* or a subset of one of the at least two frequency bands. A filter 50*a–m* on each channel path 44*a–m* passes the frequency band or channel corresponding to the channel path 44*a–m*. Alternatively, multiple channel paths 44*a–m* can carry the same frequency band, but at least two channel paths 44*a–m* carry different frequency bands which occupy non-overlapping portions of the Nyquist bandwidth or different channels of the first Nyquist zone. In this embodiment, an amplifier 52*a–m* on each channel path 44*a–m* amplifies the analog signals on the channel path 44*a–m*. The amplified analog signals on the channel paths 44*a–m* are combined by a signal combiner 54, such as an M-input combiner or an M-plexer filter, to provide a composite or combined signal of analog signals at the M frequency channels dictated by the filtering of the filters 50*a–m* on the M channel paths 44*a–m*. In this embodiment, the signal combiner 54 provides the combined analog signals in the different frequency channels to the amplifier 56 for high power signal amplification. Depending on the embodiment, the amplification of the IF analog signals can occur at the amplifier stage 52*a–m*, at the amplifier 56 and/or at other locations in the receiver architecture. The combined analog signals are provided to the analog to digital converter which samples the analog signals at a sampling rate to convert the modulated analog signals to the digital domain.

In converting the analog signals into the digital domain, the A/D converter 24 samples the analog signals at a sampling rate and produces digital values corresponding to the analog signal samples as would be understood by one of skill in the art. The Nyquist sampling rate for a modulated analog signal, for example where an information signal is modulated onto a carrier signal, can be defined as being at least twice the highest frequency component of the information signal regardless of the carrier frequency on which the information signal is modulated. The information, which can be voice, data, video, text and/or other information, is carried in the signal bandwidth. The highest frequency component of the information signal is directly related to the signal bandwidth. Because the signal bandwidth is sampled at at least twice the highest frequency component of the information signal, the information signal can be reproduced in the digital domain.

When the frequency spectrum is sampled by an A/D converter 24 at the sampling rate of at least twice the combined signal bandwidth, which can be referred to as the Nyquist sampling rate, the signal bandwidth rotates or folds periodically about itself at frequency multiples or intervals ("Nyquist zones") of one-half the sampling frequency back to a first Nyquist zone in the digital domain from 0 Hz to one-half the sampling rate. As such, a signal bandwidth and a mirror image of the signal bandwidth periodically repeat at frequency intervals corresponding to the sampling rate of the A/D converter. For example, a signal bandwidth in an odd-numbered Nyquist zone will appear in the same relative position in odd numbered Nyquist zones back to the first Nyquist zone yet appear as a mirror image in the even-numbered Nyquist zones. Moreover, a signal bandwidth in an even-numbered Nyquist zone appears as a mirror image in the odd-numbered Nyquist zones back to the first Nyquist zone while appearing in the same relative position in the even-numbered Nyquist zones. Therefore, replicas of the signal bandwidth(s) are repeated at intervals of one-half the sampling rate. The sampling rate for the A/D converter is chosen such that after the analog signals are digitized, the desired replica frequency bands occupy non-overlapping portions or channels of the first Nyquist zone. The digital conversion effectively preserves the information being produced at a rate of less than or equal to one-half the sampling rate in the bandwidth of the first Nyquist zone. If the sampling rate is increased, the first Nyquist zone or Nyquist bandwidth becomes wider.

In this embodiment, a fast Fourier transform (FFT) of the digital signal values provides signals at frequency bands (Nyquist zone channels) within one-half the sampling rate ("the first Nyquist zone") representing the converted analog signals. If the waveform is sampled at a rate less than twice its signal bandwidth (the Nyquist bandwidth), an undesirable overlapping between the adjacent periodic spectrums occurs—a well known phenomena known as aliasing. Accordingly, the sampling rate and the IF frequency band(s) are chosen to avoid loss of information due to aliasing yet provide improved efficiency in the use of the available Nyquist bandwidth.

An embodiment of the multiple branch receiver according to the principles of the present invention can be used by a cellular A band service provider to provide diversity reception in the digital domain using a single A/D converter. In the United States, a base station for an "A" band cellular service provider receives frequency channels within the A (825–835 MHz), A"(824–825 MHz) and A'(845–846.5 MHz) bands. In this example, the modulated analog signals within the A, A' and A" frequency bands are received by a first antenna 12*a* and a second antenna 12*b*. The A, A' and A" frequency bands from the first antenna 12*a* are frequency converted to an IF band(s), and the A, A' and A" frequency bands from the second antenna 12*b* are frequency converted to a different IF band(s). In converting the IF analog signal spectrum into the digital domain, the A/D converter 24 samples the IF analog signal spectrum, and the IF spectrum folds back to the first Nyquist zone (from about 0 Hz to one-half the sampling frequency). In the first Nyquist zone, replicas of the IF bands are produced at different portions or channels of the first Nyquist zone where the converted signals from the first and second antennas 12*a* and 12*b* are provided. The processing circuitry 26, such as a digital signal processor, can obtain the converted signals and perform diversity combining or other processing to the signals on the separate Nyquist zone channels.

Figure 3:
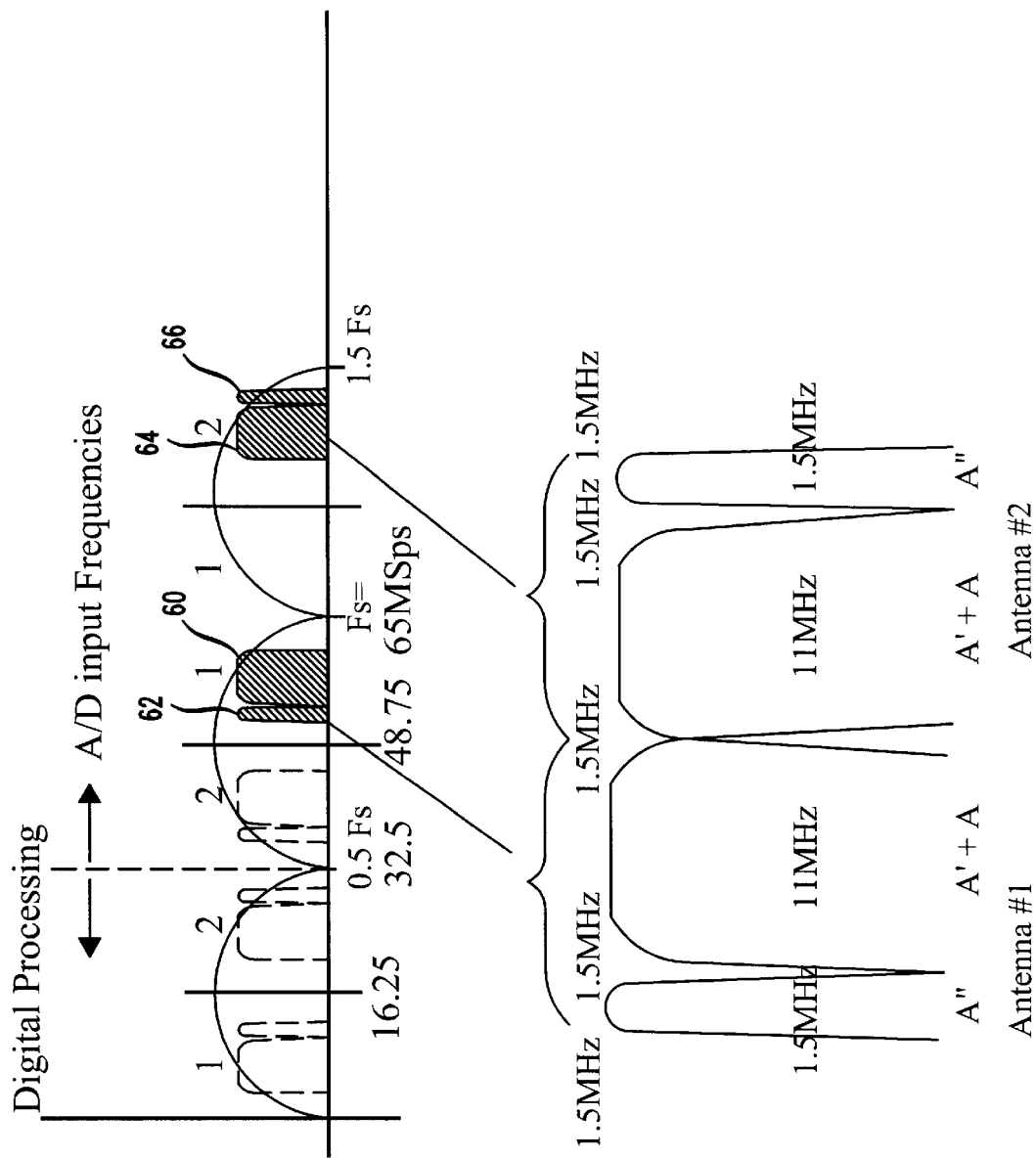
FIG. 3 shows the analog signals at the A/D input frequencies and the replicas of the analog signals in the different Nyquist zones which fold back to the first Nyquist zone in the digital domain for an embodiment of the multiple branch receiver receiving two versions of the same frequency band from different antennas.

FIG. 3 shows an example of the frequency spectrum in the digital domain and at A/D input frequencies for a receiver providing diversity for cellular signals received in the A band according to the principles of the present invention. For example, using an A/D converter 24 at a sampling rate of 65 megasamples per second (Msps) (which is greater than twice the signal bandwidth required for the two A, A' and A" bands or 25 MHz), a spectrum results in which the A/D input frequencies appear at the same frequencies which were applied to the A/D converter. Additionally, the input IF spectrum rotates or folds periodically about itself at multiples of one-half the sampling frequency back to the first Nyquist zone in the digital domain at about 0 Hz to one-half the sampling rate Fs. Each replica of the IF spectrum repeated at multiples of one-half the sampling rate is referred to as a Nyquist zone. In this example, the IF input spectrum rotates or folds about multiples of one-half the sampling frequency resulting in folds at 0 Hz, 32.5 MHz, 65 MHz and so on. Digital processing frequencies occupy the first Nyquist zone from about 0 Hz to 32.5 MHz, and A/D input frequencies occupy the second Nyquist zone (32.5–65 MHz), the third Nyquist zone (65–97.5 MHz) and so on.

With particular reference to FIG. 2 and FIG. 3, the RF analog signals in the A and A" bands from the first antenna 12a can be provided to the channel branch 16a and down-converted by a first frequency conversion stage 20a to a first IF frequency band. For example, using a bandpass filter 36a passing the A and A" RF bands and an LO 40a at 771.875 MHz, the A and A" bands from the first antenna 12a can be down-converted to a first IF band 60 (52.125–63.125 MHz) in the second Nyquist zone. The RF analog signals in the A' RF band from the first antenna 12a can be provided to the channel branch 16b and down-converted by a second frequency conversion stage 20b to a second IF frequency band. For example, using a bandpass filter 36b passing the A' band and an LO 40b of 794.375 MHz, the A' band from the first antenna 12a can be down-converted to a second IF frequency band 62 (50.625–52.125 MHz).

The RF analog signals in the A and A" bands from the second antenna 12b can be provided to a third channel branch 16c and down-converted by a third frequency conversion stage 20c to a third IF frequency band 64. For example, using a bandpass filter 36c passing the A and A" and an LO 40c of 740.875 MHz, the A and A" bands from the second antenna 12b can be down-converted to a third IF frequency band 64 at 83.125–94.125 MHz. The RF analog signals in the A' band from the second antenna 12b can be provided to a fourth channel branch 16d and down-converted by a fourth frequency conversion stage 20d to a fourth IF frequency band 66. For example, using a bandpass filter 36d passing the A' band and an LO 40d of 750.875 MHz, the A' band from the second antenna 12b can be down-converted to the fourth IF band 66 at 94.125–95.625 MHz. The analog signals in the different IF frequency bands on the channel branches 16a–d are combined by a combining arrangement 18, and the combined analog signals are provided to the A/D converter 24 for digital conversion.

When the IF spectrum is sampled by an A/D converter 24 at the exemplary sampling rate of 65 Msps (which is greater than twice the 25 MHz signal bandwidth required for both sets of A, A' and A" bands), the digital domain spectrum of FIG. 3 results in which the A/D input frequencies appear at the same IF frequencies which were applied to the A/D converter 24. Additionally, the input IF spectrum rotates or folds about itself at multiples of one-half the sampling frequency, thereby making up the Nyquist zones. As such, the replicas of the input IF spectrum are periodically repeated at frequency intervals corresponding to one-half the sampling rate of the A/D converter. The IF frequency bands of interest containing the signals for the A, A' and A" bands are also periodically duplicated within the Nyquist zones back to non-overlapping Nyquist zone channels in the first Nyquist zone. For example, the A and A" bands from the first antenna 12a folds back to 1.875–12.875 MHz, and the A' band from the first antenna 12a folds back to 12.875–14.375 MHz. Moreover, the A and A" bands from the second antenna 12b fold back to 18.125–29.125 MHz, and the A' band from the second antenna 12b folds back to 29.125–30.625 MHz.

As such, from the separate Nyquist zone channels produced from the A/D. converter 24, the digital processor 26 can receive the two versions of the converted frequency bands corresponding to the same A, A' and A" bands from the two different antennas 12a and 12b. The digital processor 26 can perform any desired diversity combining or selecting using the corresponding converted signals in the different Nyquist zone channels or perform any other processing or actions. Thus, in this example, the receiver according to the principles of the present invention enables the performance of spatial diversity using diversity techniques in the digital domain with a single A/D converter converting the analog signals from the different antennas 12a–b. By using a single A/D converter, the receiver provides time and/or phase coherent sampling of different versions of the same frequency band or channel received on different antennas. As such, time and/or phase coherency is preserved in diversity applications where accurate time delay and/or phase shift measurements may be important. Alternatively, the receiver according to the principles of the present invention can provide time and/or phase coherent sampling between signals received on different antennas in the the same and/or different frequency band(s) by using a single A/D converter to provide time and/or phase coherent sampling of the same and/or different frequency band(s) or channel(s) received on different antennas. Other applications or signal processing schemes, such as multipath reduction schemes, location determination systems, phase array and/or other intelligent antenna applications, can benefit from the improved time and/or phase coherent measurements.

Furthermore, the receiver according to the principles of the present invention improves the flexibility and bandwidth utilization of the A/D converter by enabling independent positioning of the frequency bands or subsets thereof relative to their corresponding RF analog signals into frequency bands which fold back to non-overlapping portions or channels of the first Nyquist zone. Independent positioning can further mean that the relationship between RF frequency bands or within RF frequency bands need not be maintained in the positioning of the frequency bands or subsets thereof applied to the A/D converter except that the frequency bands applied to the A/D converter fold back into non-overlapping bands or channels in the first Nyquist zone.

Figures 4, 5:
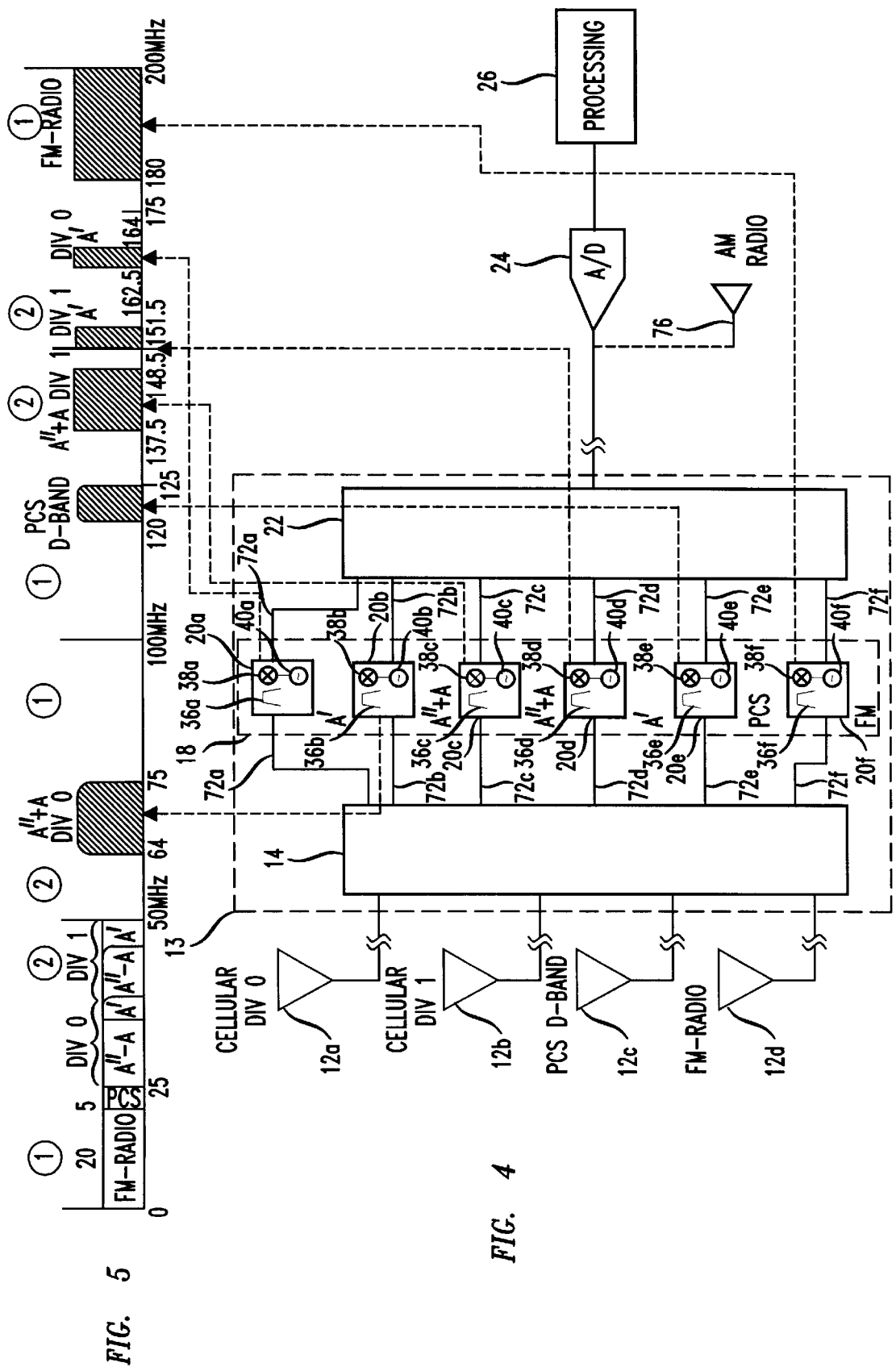
FIG. 4 shows a general block diagram of another embodiment of a multiple branch receiver according to the principles of the present invention.
FIG. 5 shows the analog signals at the A/D input frequencies and the replicas of the frequency bands at the digital domain frequencies of the first Nyquist zone for the multiple branch receiver of FIG. 4.

FIG. 4 shows an example of a receiver 70 according to the principles of the present invention, and FIG. 5 shows how the receiver can improve the bandwidth utilization of an A/D converter by independently positioning frequency bands to fit within Nyquist zone channels created by the A/D converter. In this example, the receiver 70 includes multiple antennas 12a–n. It should be understood that a multiple band antenna could be used in which the RF analog signals from the different RF frequency bands is provided to different channel branches 72a–f in the channelizer 13. In this embodiment, the first antenna 12a receives frequency channels within the A (825–835 MHz), A"(824–825 MHz) and A'(845–846.5 MHz) bands, and the second antenna 12b receives the same frequency channels within the A (825–835 MHz), A"(824–825 MHz) and A'(845–846.5 MHz) bands to provide receive diversity as described above. The channel branch arranger 14 provides the A' band from the first antenna 12a to a first branch 72a, the A and A" bands from the first antenna 12a to a second branch 72b, the A and A" bands from the second antenna 12b to a third branch 72c, and the A' band from the second antenna 12b to a fourth branch 72d. In this embodiment, the third antenna 12c receives RF analog signals in the D-block (1865–1870 MHz) of the Personal Communications System (PCS) frequency bands. The channel branch arranger 14 provides the RF analog signals in the PCS bands from a third antenna 12c to a fifth branch 72e. The fourth antenna 12d receives RF analog radio signals in the FM radio frequency band (88 to 108 MHz), and the channel branch arranger 14 provides the FM signals from the fourth antenna 12d to a sixth branch 72f.

The total bandwidth of the RF analog signals on the different branches 72a–f is 50 MHz after adding the two A bands (12.5 MHz each), the 5 Mhz PCS band and the 20 MHz FM radio band. As such, a sampling rate for the A/D converter 24 is used such that the Nyquist zone bandwidth is sufficient to handle the 50 MHZ bandwidth of the RF analog signals. For illustrative purposes, a 100 MHz sampling rate is used for the A/D converter 24 to provide a Nyquist zone bandwidth of 50 MHz (one-half the sampling rate). In practice, a higher sampling rate may be selected to provide extra bandwidth or guard bands between the signals of the different frequency bands or branches. The frequency conversion arrangement 18 independently positions the RF frequency bands from the different branches into frequency bands that fold back to non-overlapping bands or channels in the first Nyquist zone. The frequency conversion arrangement 18 changes the positioning of the RF analog signals on the multiple branche 72a –f relative to how the analog signals are positioned in the Nyquist bandwidth, not relative to their positioning at RF, to enable increased utilization of the Nyquist bandwidth of the A/D converter 24.

In this embodiment, each branch 72a –f includes a frequency conversion stage 20a –f to convert the RF analog signals to IF frequency bands which fold back to non-overlapping portions or channels of the Nyquist bandwidth or the first Nyquist zone. For example, the RF analog signals of the A' band on the first branch 72a are converted by the first frequency stage 20a to a frequency band of 162.5–164 MHz by mixing the RF analog signals with a signal of 682.5 MHz from the LO 40a. The RF analog signals of the A and A" bands on the second branch 72b are converted by the second frequency stage 20b to a frequency band of 64–75 MHz by mixing the RF analog signals with a signal of 760 MHz from the LO 40b. The RF analog signals of the A and A" bands on the third branch 72c are converted by the third frequency stage 20c to a frequency band of 137.5–148.5 MHz by mixing the RF analog signals with a signal of 686.5 MHz from the LO 40c. The RF analog signals of the A' band on the fourth branch 72d are converted by the fourth frequency stage 20d to a frequency band of 150–151.5 MHz by mixing the RF analog signals with a signal of 695 MHz from the LO 40d. The RF analog signals of the D-block in the PCS band on the fifth branch 72e are converted by the fifth frequency stage 20e to a frequency band of 120–125 MHz by mixing the RF analog signals with a signal of 1745 MHz from the LO 40e. The RF analog signals of the FM radio band on the sixth branch 72f are up-converted by the sixth frequency stage 20f to a frequency band of 180–200 MHz by mixing the RF analog signals with a signal of 92 MHz from the LO 40f.

The analog signals positioned in the IF frequency bands mentioned above can be combined in a combining arrangement 22 to be converted by the A/D converter 24. The A/D converter samples the analog signals in the IF spectrum and produces signals in the first Nyquist zone corresponding to the RF analog signals on the different branches 72a –f which were positioned within the IF spectrum. In this example using a sampling rate of 100 MHz, the first Nyquist zone is from 0 to 50 MHz with six Nyquist zone channels from which the digital processor 26 can obtain signals to the RF signals from the different RF bands or branches. For example, a first Nyquist zone channel from 0 Hz to 20 MHz corresponds to the FM radio signals from the fourth antenna 12d. A second Nyquist zone channel from 20 to 25 MHz corresponds to the signals in the D-block of the PCS band from the third antenna 12c. A third Nyquist zone channel from 25 to 36 MHz corresponds to the signals on the A and A" bands from the first antenna 12a, and a fourth Nyquist zone channel from 36 to 37.5 corresponds to the signals on the A' bands from the first antenna 12a. A fifth Nyquist zone channel from 37.5 to 48.5 corresponds to the signals on the A and A" bands from the second antenna 12b, and a sixth Nyquist zone channel from 48.5 to 50 MHz corresponds to signals on the A' band from the second antenna 12b.

By properly positioning the RF frequency bands in the appropriate IF frequency bands, the receiver according to the principles of the present invention can increase the utilization of the available Nyquist bandwidth provided by the A/D converter 24. In the above example, the entire Nyquist bandwidth for a sampling rate of 100 MHz was filled. In other embodiments, different sampling rates can be used to increase or decrease the Nyquist bandwidth. In alternative embodiments, if the RF frequency band is positioned in a desired portion of the spectrum, then frequency conversion of the RF frequency band may not be performed. For example, with particular reference to FIG. 4, if the sampling rate were increased to provide a wider Nyquist bandwidth, an AM radio frequency band (550–1600 kHz) can be received by an antenna 76 and added to the combined or composite analog signal, and the A/D converter 24 could digitize the analog signals in the AM frequency band. The AM radio frequency band would be located in the kilohertz range of the first Nyquist zone, and may not require frequency conversion. As such, the receiver according to the principles of the present invention could receive signals from different sources, such as the base stations for cellular or PCS systems, AM or FM broadcast radio stations and/or GPS satellites.

In addition to the embodiment described above, .alternative configurations of the multiple analog branch receiver architecture according to the principles of the present invention are possible which omit and/or add components and/or use variations or portions of the described receiver architecture. As would be understood by one of ordinary skill in the art, the various components making up the receiver architecture and their respective operating parameters and characteristics should be properly matched up to provide the proper operation. For example, an embodiment of the receiver system can be used to receive signals from a North American TDMA system, a Global System For Mobile Communication (GSM) system, a code division multiple access (CDMA) system, frequency division multiple access (FDMA) systems, Global Positioning System (GPS), FM radio and/or AM radio. Accordingly, the receiver according to the principles of the present invention can receive and digitally convert in a single A/D converter analog signals from system(s) using different, the same or no multiple access techniques, using the same and/or different modulation techniques, and/or using different and/or the same frequency bands or schemes. The analog signals can be characterized as wideband, broadband and/or narrowband. Additionally, the embodiments of the receiver according to the principles of the present invention have been described with frequency band(s) associated with base station receive frequencies, but the receiver architecture according to the principles of the present invention can be used in wireless units, such as mobile units, receiving information from other frequency band(s), such as a wireless unit receive band.

Furthermore, the receiver system has been described using a particular configuration of distinct components, but it should be understood that the receiver system and portions thereof can be implemented in application specific integrated circuits, software-driven processing circuitry, firmware, programmable logic devices, hardware or other arrangements of discrete components as would be understood by one of ordinary skill in the art with the benefit of this disclosure. Although in the illustrative embodiment is shown with a particular circuitry, the measurement radio architecture can use different components which together perform similar functions when compared to the circuitry shown. What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

What is claimed is:

1. A method of processing received signals, comprising:
   providing analog signals on a plurality of channel branches;
   adjusting the frequency of said analog signals on said plurality of channel branches;
   combining said analog signals; and
   digitally converting said combined analog signals,
   said adjusting including independently positioning each of said analog signals on said plurality of channel branches relative to how the analog signals are to be positioned in a Nyquist zone when digitally converted, so that said digitally converting of said combined analog signals produces frequency bands in substantially non-overlapping portions of the Nyquist zone.

2. The method of claim 1, further comprising:
   receiving said analog signals on at least two antennas.

3. The method of claim 2, wherein said providing further includes:
   using a first antenna to provide analog signals of a frequency band on a first channel branch; and
   using a second antenna to provide analog signals of said frequency band on a second channel branch.

4. The method of claim 2, wherein said providing further includes:
   using a first antenna to provide analog signals of a first frequency band on a first channel branch; and
   using a second antenna to provide analog signals of a second frequency band on a second channel branch.

5. The method of claim 2, wherein said providing further includes:
   combining said analog signals received by said at least two antennas; and
   filtering, on each channel branch, said analog signals to provide analog signals having a frequency band corresponding to each channel branch.

6. The method of claim 2, wherein said providing further includes:
   receiving analog signals from at least one antenna; and
   selectively producing, on each channel branch, analog signals having a frequency band corresponding to each channel branch.

7. The method of claim 1, wherein said adjusting further includes:
   frequency converting analog signals on each channel branch to a corresponding intermediate frequency (IF) band.

8. A receiver comprising:
   a channel branch arranger connected to at least one antenna for receiving analog signals and providing analog signals onto a plurality of channel branches;
   at least one frequency conversion arrangement configured to adjust the frequency of analog signals on said plurality of channel branches;
   a combining arrangement connected to said plurality of channel branches to combine said analog signals; and
   an analog to digital converter configured to receive and digitally convert said combined analog signals,
   said at least one frequency conversion arrangement being further configured to independently position each of said analog signals on said plurality of channel branches relative to how the analog signals are to: be positioned in a Nyquist zone when digitally converted, so that said analog to digital converter converts said combined analog signals to produce frequency bands in substantially non-overlapping portions of the Nyquist zone.

9. The receiver of claim 8, further comprising:
   at least two antennas to provide said channel branch arranger with said analog signals.

10. The receiver of claim 9, wherein said channel branch arranger is configured to provide, on a first channel branch, analog signals from a first antenna of a frequency band, and to provide, on a second channel branch, analog signals from a second antenna of said frequency band.

11. The receiver of claim 9, wherein said channel branch arranger is configured to provide, on a first channel branch, analog signals from a first antenna of a first frequency band, and to provide, on a second channel branch, analog signals from a second antenna of a second frequency band.

12. The receiver of claim 9, wherein said channel branch arranger further includes:
   a combiner which receives said analog signals from at least one antenna and provides a replica of said analog signals on a plurality of channel branches, and
   a filter on each of said channel branches to provide analog signals having a frequency band corresponding to said channel branch.

13. The receiver of claim 9, wherein said channel branch arranger further includes:
   a multiplexer which receives said analog signals from at least one antenna and provides, on each of said channel branches, analog signals having a frequency band corresponding to said channel branch.

14. The receiver of claim 8, wherein said at least one frequency converter further includes a frequency converter on each channel branch to convert analog signals on said each of said channel branches to a corresponding intermediate frequency (IF) band.

15. A method of processing received signals, said method comprising:
   providing analog signals from at least two antennas onto at least two channel branches;
   adjusting the frequency of said analog signals on at least one of said at least two channel branches such that said analog signals on said at least two channel branches are at different frequencies;
   combining said analog signals; and
   digitally converting said combined analog signals,
   said adjusting including independently positioning each of said analog signals on said at least one of said at least two channel branches relative to how the analog signals are to be positioned in a Nyquist zone when digitally converted, so that said digitally converting of said combined analog signals produces frequency bands in substantially non-overlapping portions of the Nyquist zone.

16. A method of processing received signals, said method comprising:

providing analog signals from at least two antennas onto at least two channel branches;

adjusting the frequency of said analog signals on at least one of said at least two channel branches such that said analog signals on said at least two channel branches are at different frequencies;

combining said analog signals on said at least two channel branches; and digitally converting said combined analog signals, said adjusting including independently positioning each of said analog signals on said at least two channel branches relative to how the analog signals are to be positioned in a Nyquist zone when digitally converted, so that said digitally converting of said combined analog signals produces frequency bands in substantially non-overlapping portions of the Nyquist zone.

* * * * *